United States Patent
Liao

(10) Patent No.: US 11,381,132 B2
(45) Date of Patent: Jul. 5, 2022

(54) POWER GENERATION METHOD AND SYSTEM EQUIPPED WITH ENERGY STORAGE AND ENERGY RELEASE ACCOMMODATION MECHANISM

(71) Applicant: InfiniForce, Inc., Wilmington, DE (US)

(72) Inventor: Ming-Chen Liao, Wilmington, DE (US)

(73) Assignee: INFINIFORCE, INC., Wilmington, DE (US)

( * ) Notice: Subject to any disclaimer, the term of this patent is extended or adjusted under 35 U.S.C. 154(b) by 129 days.

(21) Appl. No.: 17/009,395

(22) Filed: Sep. 1, 2020

(65) Prior Publication Data

US 2022/0069667 A1    Mar. 3, 2022

(51) Int. Cl.
| | | |
|---|---|---|
| *H02J 3/32* | (2006.01) | |
| *H02K 7/02* | (2006.01) | |
| *H02K 7/20* | (2006.01) | |
| *H02J 7/35* | (2006.01) | |

(52) U.S. Cl.
CPC ............. *H02K 7/025* (2013.01); *H02J 3/32* (2013.01); *H02J 7/35* (2013.01); *H02K 7/20* (2013.01)

(58) Field of Classification Search
CPC ... H02J 3/32; H02J 7/35; H02K 7/025; H02K 7/20
See application file for complete search history.

(56) References Cited

U.S. PATENT DOCUMENTS

2019/0115758 A1\* 4/2019 Orban ................ H02J 9/066
2019/0334352 A1\* 10/2019 Sugimoto ............ H02J 3/04

\* cited by examiner

*Primary Examiner* — Adolf D Berhane
*Assistant Examiner* — Afework S Demisse

(57) ABSTRACT

The invention provides a power generation method and a system equipped with energy storage and energy release accommodation mechanism. By using an energy storage and energy release accommodation system arranged in the system, the generator set at an end of the system can immediately supplement energy from an energy storage unit after providing electric energy to a load, so that the output energy will not drop suddenly, while still stably maintaining both the rated energy output and the system operation.

10 Claims, 2 Drawing Sheets

POWER GENERATION METHOD AND SYSTEM EQUIPPED WITH ENERGY STORAGE AND ENERGY RELEASE ACCOMMODATION MECHANISM

BACKGROUND OF THE INVENTION

1. Field of the Invention

The invention relates to a power generation method and system equipped with energy storage and energy release accommodation mechanism.

2. Description of the Prior Art

For many years, most of the developers engaged in flywheel auxiliary power generation only use flywheel units to store energy. However, when the flywheel is switching-on the load, the inertia stored in the flywheel will also be released immediately, resulting in a rapid drop in rotating speed, so no real successful case has been seen.

In view of this, the present invention provides an energy storage system and method equipped with energy storage and energy release accommodation mechanism, so that the generator set at the end of the system can immediately supplement energy from the energy storage unit after providing electric energy to the load. It is the objective of the invention to prevent the output energy from dropping suddenly, while still stably maintaining both the rated energy output and the system operation.

SUMMARY OF THE INVENTION

An objective of the invention is to provide a power generation system that utilizes the energy storage and energy release accommodation mechanism arranged in the system to provide self-operation of the system and provide electric energy to external load. Especially refers to a multi-level flywheel linkage system composed of energy storage unit, energy release unit, variable speed gear unit, power generation unit, electric power storage unit and electric circuit modulation unit, etc. There are multi-level flywheel groups arranged in the system, which are basically divided into driving master wheel, driven accommodation wheel and output wheel. When the driving master wheel is driven by mechanical energy to reach a rated rotating speed, and the maximum energy in the system is stored, the driving master wheel that stores the largest inertia in the system transfers energy to the driven accommodation wheel. According to the system itself and the scale of the load, the driven accommodation wheel can be concurrently served by the driving master wheel, or it can be one or more than one. That is to say, the driven accommodation wheel group can be composed of one or more driving master wheels. Depending on the actual needs of the whole system, the number of driven accommodation wheels is designed and configured. For example, when the energy demand is small, the driving master wheel can also be used as an accommodation wheel, and the output wheel is connected behind to drive the generator. However, if the energy output is large, or sometimes large and sometimes small resulting in a large fall head, that is, when the power generated by the generator supplies a large load, more accommodation wheels can be added to supplement the accommodation mechanism of the rear wheel by immediately releasing the energy of the front wheel to maintain the continuous operation of the system. In this way, it can be avoided that when the rotating speed of the output wheel drops sharply due to the instantaneous increase of output energy, the front accommodation wheels can immediately release the pre-stored energy to maintain the demand of the rear hub or generator.

Another objective of the invention is that there are many people engaged in flywheel auxiliary power generation research and development all over the world for many years, but there are no real successful cases so far. The main reason is that when the flywheel is switching-on the load, the rotating speed of the flywheel will decrease accordingly, and the stored energy will be released immediately, that is the law of conservation of energy. However, because the method of the invention has multi-level energy storage and energy release accommodation mechanism, when the generator connected to the last output wheel is switching-on the load, the output wheel releases energy to the generator or the load. According to the law of conservation of energy, while the rotating speed of the output wheel decreases, the accommodation wheel in front of the output wheel can immediately release energy to supplement the output wheel, so that it can restore to the rated rotating speed and maintain the inertia in the shortest time. In the same way, since the accommodation wheel releases energy to the output wheel, unless the inertia stored by the accommodation wheel itself is much greater than the energy released to the output wheel, the rotating speed of the accommodation wheel will inevitably drop automatically. At this time, since the diameter, rotating speed and mass of the driving master wheel reach a certain degree, the energy stored in the driving master wheel is sufficient to fully distribute to the accommodation wheel, so that the rated rotating speed can be restored immediately and the established inertia can be maintained. Then, the driving master wheel only needs to extract a small part or other additional mechanical energy from the prime mover, so as to maintain the continuous operation of the system, which is the most significant performance of the present invention.

The secondary objective of the invention is to provide an energy storage method equipped with energy storage and energy release accommodation mechanism, in which each hub is designed to operate independently of different axes, and then a belt, a chain or other suitable rotating mechanism is connected to form a system. Each hub of the system has a high degree of freedom of rotation, and each maintains its rated inertia to supply energy to its corresponding hub or generator set. Its scale can be adjusted as required, and it can also be a fixed, mobile or combined mechanism. The prime mover and generator can be directly connected with their corresponding hubs, running at the same rotating speed, or connected with belts, chains or other suitable transmission units, and their relative rotating speeds can be accommodated freely according to the needs of the system.

The other objective of the invention is to provide an energy storage method, the prime mover used can be an internal combustion engine, an electric motor or other mechanical energy output mechanisms. In order to improve the energy consumption efficiency, the system constructed by the method of the invention is between the prime mover and the driving master wheel, and the energy transmission between the hubs in the system can be equipped with a clutch, a speed changer or a continuously variable transmission (CVT) and other variable speed gears. Since the system constructed by the method of the invention is connected and pulled by each hub, its mass is already very large. The basic situation is that when the prime mover is initially activated to overcome the static friction force of the whole hub, relatively large power must be applied to overcome the driving. At this time, setting the aforementioned variable speed gear unit in the prime mover and the driving master wheel can greatly save the energy consumption of the prime mover at the initial start-up, and make the activating process of the whole system more smooth.

Moreover, the variable speed gear unit can be further arranged among hubs to drive each of the hubs individually in sequence. In other words, the driving master wheel is first driven by the prime mover through the aforementioned variable speed gear unit. When the driving master wheel reaches a certain rotating speed and obtains a specific inertia, the variable speed gear unit between the driving master wheel and the driven accommodation wheel is activated to drive the driven accommodation wheel. When the driven accommodation wheel also reaches a certain rotating speed and obtains a specific inertia, the variable speed gear unit between the driven accommodation wheel and an output wheel behind it is activated to drive the output wheel. When the output wheel also reaches a certain rotating speed and obtains a specific inertia, the variable speed gear unit between the output wheel and the generator behind it is activated to drive the generator. At this time, the generator is usually connected to the load and can directly transmit the electric power to the load for use.

REFERENCE SIGNS

| | | | |
|---|---|---|---|
| 11 | driving master wheel | 13 | driven accommodation wheel |
| 15 | output wheel | 21 | prime mover |
| 23 | transmission unit | 25 | transmission unit |
| 27 | generator | 31 | control unit |
| 315 | panel board | 33 | electric power storage unit |
| 37 | electric circuit modulation unit | 38 | socket |
| 39 | load | | |

DETAILED DESCRIPTION OF THE PREFERRED EMBODIMENTS

Figure 1:
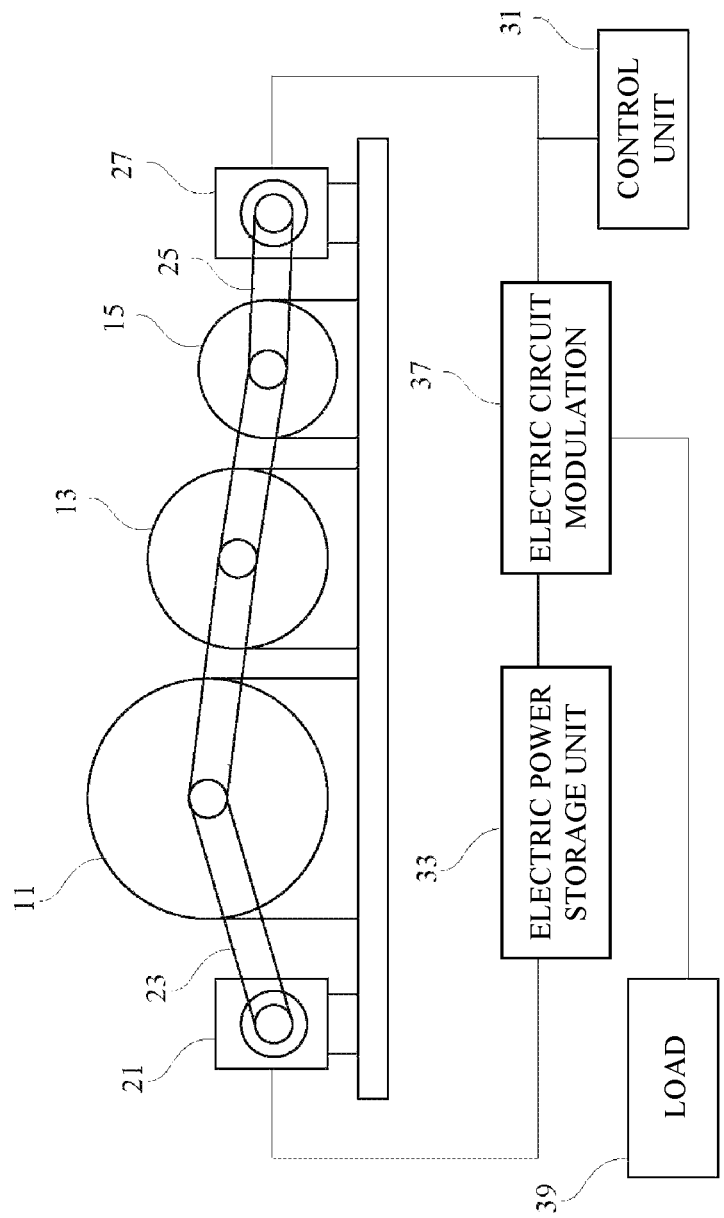
FIG. 1 is a structural schematic diagram of an embodiment of the present invention.

Please refer to FIG. 1, which is a structural schematic diagram of an embodiment of an energy storage system equipped with an energy storage and energy release accommodation mechanism according to the present invention. The energy storage system of the invention is equipped with a driving master wheel 11, a driven accommodation wheel 13, and an output wheel 15. Among them, the driving master wheel 11 is driven by a prime mover 21 with a transmission unit 23 such as a belt, and the generator 27 is driven by the output wheel 15 with another transmission unit 25 such as a belt.

In an embodiment of the present invention, after the built-in control unit 31 of the system issues a start-up instruction, the prime mover 21 obtains the electric energy provided by an electric power storage unit 33, and thus generates a mechanical energy. The mechanical energy generated by the prime mover 21 slowly pulls the driving master wheel 11 to start to rotate via a transmission unit 23 such as a belt, and then synchronously pulls the driven accommodation wheel 13 and the output wheel 15 at the end to rotate in sequence. In this embodiment, only a general overview is given. In the system, a hub is respectively arranged at the axle center of the driving master wheel 11, the driven accommodation wheel 13 and the output wheel 15, and a belt, a chain or other suitable transmission units 23 and 25 for traction can be individually used to drive the wheels between the hubs.

In the system of the invention, the prime mover 21 needs to output high-power electric energy to overcome the static friction force at the initial start-up of each of the hubs. Therefore, the energy density of the electric power storage unit 33 needs to be adjusted appropriately. When the driving master wheel 11, the driven accommodation wheel 13 and the output wheel 15 reach a rated rotating speed, the inertia stored in each of the hubs is already sufficient. At this time, the control unit 31 further issues another instruction to activate at least one (external) load 39, and the generator 27 generates electric power and supplies power to the built-in electric power storage unit 33 of the system and other loads 39 through an electric circuit modulation unit 37. The output wheel 15 releases the stored energy to the generator 27, which is converted into electrical energy by the action of the generator 27 and supplied to the load 39. Although the rotating speed of the output wheel 15 will decrease instantaneously, at this time, the driven accommodation wheel 13 can also supply the stored energy to the output wheel 15 simultaneously, so that the output wheel 15 can obtain the energy supplement immediately, return to the rated rotating speed and maintain the inertia.

At the same time, since the output energy of the driven accommodation wheel 13 is given to the output wheel 15, the rotating speed of the driven accommodation wheel 13 will also be decreased simultaneously, and the original rated inertia will be attenuated. The driving master wheel 11 will timely output energy to the driven accommodation wheel 13. After the driven accommodation wheel 13 obtains the energy supplement, it will quickly restore to the rated rotating speed and maintain its inertia. In the same way, the rotating speed of the driving master wheel 11 is also attenuated by providing energy to the driven accommodation wheel 13, thus reducing its existing stored inertia. After the control unit 31 detects this phenomenon, the prime mover 21 will continue to provide mechanical energy to the driving master wheel 23. Due to the continuous operation of the system, the prime mover 21 only needs to provide a very small amount of electrical energy to supplement the mechanical energy of the driving master wheel 11 to maintain its rated rotating speed.

Figure 2:
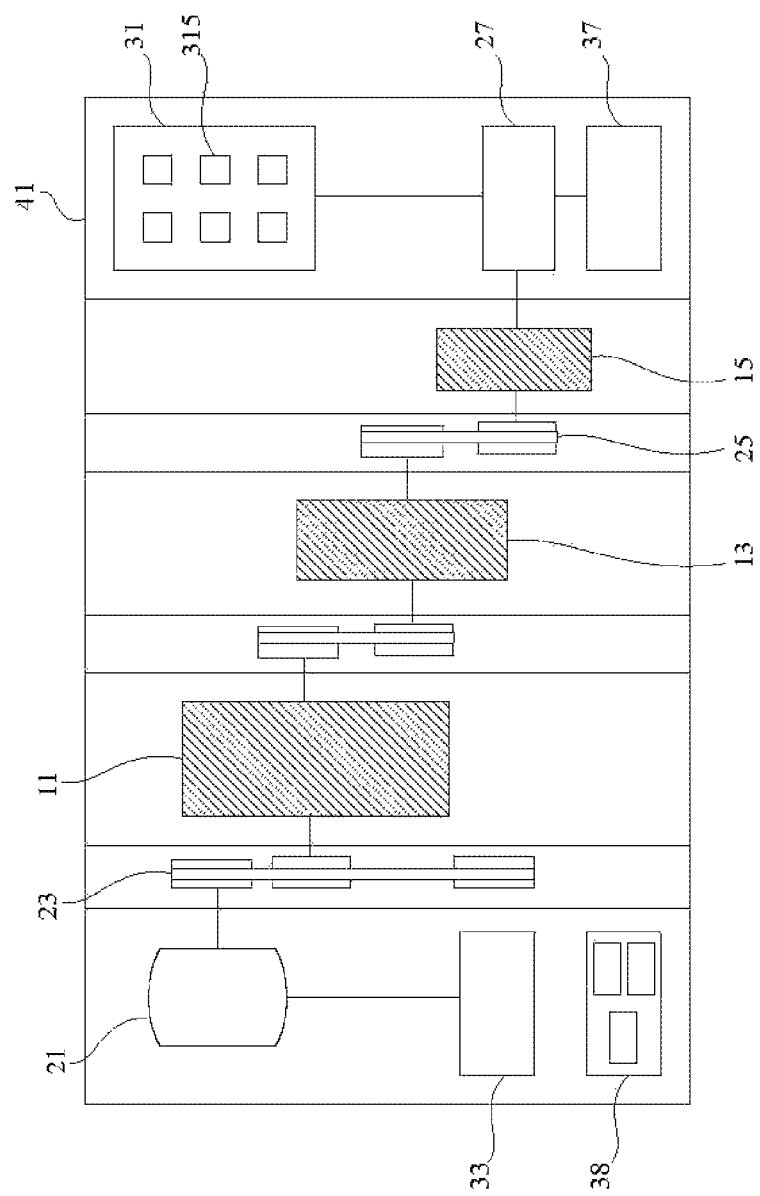
FIG. 2 is a structural schematic diagram of another embodiment of the present invention.

In addition, please refer to FIG. 2, which is a structural schematic diagram of an application embodiment of the invention. As shown in the figure, the invention can be used in a mobile power generation device, such as vehicle, family, labor lodging, battlefield, assembly and other places. In an enclosed space, the atmosphere is evacuated to form a vacuum chamber 41, which is equipped with a driving master wheel 11, a driven accommodation wheel 13 and an output wheel 15. The driving master wheel 11 is connected with the prime mover 21 by a transmission unit 23 such as a belt, the output wheel 15 is also coaxial connected with the generator 27, and the remaining hubs are connected by transmission units 23, 25 such as belts, chains, and output tapes, so as to form an energy storage system made by the method of the invention.

The control unit 31 of the invention will manage the operation of each unit and component in the system according to the set program, including but not limited to the electric power storage unit 33, the electric circuit modulation unit 37, the prime mover 21, the driving master wheel 11, the driven accommodation wheel 13, the output wheel 15 and the generator 27. It can also include the monitoring and accommodation mechanism for the operation of various components and units, such as vacuum degree detector, vacuum trap and pump, which are not shown in the diagram.

The operator activates the control unit 31 based on needs, and the control unit 31 can activate the prime mover 21 according to various operating parameters and conditions preset by the system administrator. The prime mover 21 initially overcomes the static friction force of each of the hubs in the system with high-power electric energy, and then gradually pulls each of the hubs to run. After each of the hubs reaches the rated rotating speed, the panel board 315 of the control unit 31 will display the data of rotating speed of the hub, the current, voltage, frequency of the prime mover 21, and/or the vacuum degree of the vacuum chamber 41. At this time, the operator can manually or continue to automatically activate the load 39 by the control unit 31, including the built-in electric power storage unit 33 of the system or at least one socket 38, to supply power to the load 39 outside the system.

During the operation of the system, the data on the panel board 315 may change slightly. For example, when the vacuum degree deviates, the control unit 31 can timely activate the pump of the vacuum trap to maintain the vacuum degree in the vacuum chamber 41, so as to reduce the friction force between the each of the running hubs and the air. In this way, the energy consumption attenuation of the prime mover can be reduced. The operation actions of the embodiments of each unit of the invention are similar, and will not be repeated here.

The above embodiments are only general case illustrations, and the system established by the method of the invention can be further improved to promote its energy efficiency. For example, a clutch is set up so that the system does not need to release high-power electric energy at the initial start-up, or safety devices such as brake units and shock absorbers are installed in the system to cope with sudden natural disasters or human errors. In another embodiment of the invention, the communication unit can be combined with a wireless remote manipulation and control the operation of multiple systems, so as to improve its application efficiency and security, and prevent industrial safety accidents.

The energy storage system and method disclosed in the invention can break through the traditional flywheel energy storage method, effectively utilize the ingenious design of the system itself to obtain continuous and uninterrupted automatic operation, and can further supply power to the load outside the system in addition to meeting the operation requirements of the system's own prime mover. If the system made according to the invention is configured on a vehicle, such as an electric vehicle, its endurance can be expanded and extended. In addition to significant reduction and improvement of air pollution, the vehicle can also be used as an energy-supply station, thus achieving great improvements both in reducing the construction of charging stations and the convenience of users.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A power generation method and system equipped with energy storage and energy release accommodation mechanism, comprising:
    a driving master wheel through a transmission unit connected to a prime mover which drives the transmission unit and rotates the driving master wheel;
    a driven accommodation wheel through the transmission unit connected to the driving master wheel which drives the transmission unit and rotates the driven accommodation wheel;
    an output wheel through the transmission unit connected to a generator and the driven accommodation wheel which drives the transmission unit and rotates the output wheel which drives the generator for electric power generation;
    an electric power storage unit electrically connected to the generator and the prime mover respectively, which receives electric energy from the generator and provides the electric energy to the prime mover; and
    a control unit electrically connected to the driving master wheel, the driven accommodation wheel, the output wheel, the electric power storage unit, the prime mover and the generator respectively, which can adjust the electric energy output from the electric power storage unit to the prime mover according to a rotating speed of each of the driving master wheel, the driven accommodation wheel and the output wheel.

2. The power generation method and system equipped with energy storage and energy release accommodation mechanism of claim 1 further comprises an electric circuit modulation unit which is electrically connected to the electric power storage unit, the generator and at least one load, respectively.

3. The power generation method and system equipped with energy storage and energy release accommodation mechanism of claim 2, wherein each of the at least one load is a socket.

4. The power generation method and system equipped with energy storage and energy release accommodation mechanism of claim 1, wherein the transmission unit is a belt, a chain or other transmission devices.

5. The power generation method and system equipped with energy storage and energy release accommodation mechanism of claim 1, wherein the control unit includes a panel board.

6. The power generation method and system equipped with energy storage and energy release accommodation mechanism of claim 1, wherein the driving master wheel, the driven accommodation wheel and the output wheel are arranged in a vacuum chamber.

7. The power generation method and system equipped with energy storage and energy release accommodation mechanism of claim 1, wherein a clutch, a speed changer, a shock absorber or a brake unit is arranged between the prime mover, the driving master wheel, the driven accommodation wheel and the output wheel.

8. The power generation method and system equipped with energy storage and energy release accommodation mechanism of claim 1, wherein the control unit is electrically connected to a communication unit.

9. An energy storage method that can use the energy storage system described in claim 1, mainly comprising:
    monitoring the rotating speed of the driving master wheel by the control unit; and
    controlling a mechanical energy output value of the prime mover according to the rotating speed of the driving master wheel, so as to drive the driving master wheel to maintain a rated rotating speed.

10. The energy storage method of claim 9 further comprises
electrically connecting an electric circuit modulation unit to the electric power storage unit, the generator and at least one load, respectively;
receiving an instruction of the control unit from the electric circuit modulation unit; and
adjusting the electric energy produced by the generator timely to transmit to the electric power storage unit or the at least one load for use.

\* \* \* \* \*